United States Patent
Subramanian et al.

(10) Patent No.: US 9,473,366 B2
(45) Date of Patent: *Oct. 18, 2016

(54) TECHNIQUES FOR MEASURING ABOVE-THE-FOLD PAGE RENDERING

(71) Applicant: EBAY INC., San Jose, CA (US)

(72) Inventors: Mahesh Subramanian, San Jose, CA (US); Eric Ye, Saratoga, CA (US); Ramu Korlipara, Union City, CA (US); Francis Smith, San Jose, CA (US)

(73) Assignee: eBay Inc., San Jose, CA (US)

( * ) Notice: Subject to any disclaimer, the term of this patent is extended or adjusted under 35 U.S.C. 154(b) by 291 days.

This patent is subject to a terminal disclaimer.

(21) Appl. No.: 14/320,484

(22) Filed: Jun. 30, 2014

(65) Prior Publication Data

US 2014/0317282 A1    Oct. 23, 2014

Related U.S. Application Data

(63) Continuation of application No. 11/284,371, filed on Nov. 21, 2005, now Pat. No. 8,812,648.

(51) Int. Cl.
| | |
|---|---|
| *G06F 15/173* | (2006.01) |
| *H04L 12/26* | (2006.01) |
| *G06F 11/34* | (2006.01) |
| *G06F 17/22* | (2006.01) |

(52) U.S. Cl.
CPC ............ *H04L 43/04* (2013.01); *G06F 11/3419* (2013.01); *G06F 11/3476* (2013.01); *G06F 17/2247* (2013.01); *G06F 11/3457* (2013.01); *G06F 2201/875* (2013.01)

(58) Field of Classification Search
CPC ............... H04L 43/04; G06F 11/3419; G06F 11/3476; G06F 17/2247; G06F 2201/875; G06F 11/3457

See application file for complete search history.

(56) References Cited

U.S. PATENT DOCUMENTS

| | | | | |
|---|---|---|---|---|
| 6,973,490 | B1* | 12/2005 | Robertson | H04L 41/022 709/202 |
| 7,191,211 | B2* | 3/2007 | Tuli | H04L 69/329 707/E17.121 |
| 7,346,694 | B2* | 3/2008 | Philyaw | G06F 3/14 709/206 |
| 7,349,960 | B1 | 3/2008 | Pothier et al. | |
| 7,356,736 | B2 | 4/2008 | Natvig | |
| 7,447,209 | B2 | 11/2008 | Jeffay et al. | |
| 7,454,434 | B1 | 11/2008 | Cohen et al. | |
| 8,812,648 | B2 | 8/2014 | Subramanian et al. | |
| 2001/0003823 | A1* | 6/2001 | Mighdoll | G06F 3/04892 709/200 |
| 2002/0147937 | A1 | 10/2002 | Wolf | |
| 2003/0055809 | A1 | 3/2003 | Bhat | |

(Continued)

OTHER PUBLICATIONS

"U.S. Appl. No. 11/284,371, Advisory Action mailed Jun. 9, 2011", 3 pgs.

(Continued)

*Primary Examiner* — Krista Zele
*Assistant Examiner* — James Forman
(74) *Attorney, Agent, or Firm* — Schwegman, Lundberg & Woessner, P.A.

(57) ABSTRACT

Techniques for measuring above-the-fold (ATF) page rendering are provided. Visible objects for an ATF portion of a browser page are identified. A start and end time for each visible object is recorded. Furthermore, a total elapsed time to finish loading each of the visible objects to the ATF portion of a browser is determined.

20 Claims, 7 Drawing Sheets

(56) References Cited

U.S. PATENT DOCUMENTS

| | | |
|---|---|---|
| 2003/0229695 A1 | 12/2003 | McBride |
| 2004/0012627 A1 | 1/2004 | Zakharia et al. |
| 2006/0026302 A1 | 2/2006 | Bennett et al. |
| 2006/0062362 A1 | 3/2006 | Davis |
| 2006/0069714 A1 | 3/2006 | Blount et al. |
| 2006/0069808 A1 | 3/2006 | Mitchell et al. |
| 2006/0136578 A1 | 6/2006 | Covell et al. |
| 2006/0259859 A1 | 11/2006 | Ivarsoy et al. |
| 2007/0027839 A1 | 2/2007 | Ives |
| 2007/0061443 A1 | 3/2007 | Chavda |
| 2007/0118640 A1 | 5/2007 | Subramanian et al. |
| 2007/0299968 A1 | 12/2007 | Loboz et al. |

OTHER PUBLICATIONS

"U.S. Appl. No. 11/284,371, Advisory Action mailed Sep. 4, 2009", 3 pgs.

"U.S. Appl. No. 11/284,371, Decision on Pre-Appeal Brief Request mailed Aug. 9, 2011", 4 pgs.

"U.S. Appl. No. 11/284,371, Examiner Interview Summary mailed Aug. 9, 2011", 4 pgs.

"U.S. Appl. No. 11/284,371, Final Office Action mailed Mar. 16, 2011", 39 pgs.

"U.S. Appl. No. 11/284,371, Final Office Action mailed Jun. 25, 2010", 34 pgs.

"U.S. Appl. No. 11/284,371, Final Office Action mailed Jun. 26, 2009", 30 pgs.

"U.S. Appl. No. 11/284,371, Non-Final Office Action mailed Oct. 26, 2010", 40 pgs.

"U.S. Appl. No. 11/284,371, Non-Final Office Action mailed Nov. 25, 2009", 34 pgs.

"U.S. Appl. No. 11/284,371, Non-Final Office Action mailed Nov. 28, 2008", 29 pgs.

"U.S. Appl. No. 11/284,371, Notice of Allowance mailed Apr. 2, 2014", 16 pgs.

"U.S. Appl. No. 11/284,371, Pre-Appeal Brief Request filed Jun. 16, 2011", 5 pgs.

"U.S. Appl. No. 11/284,371, Response filed Jan. 20, 2011 to Non Final Office Action mailed Oct. 26, 2010", 16 pgs.

"U.S. Appl. No. 11/284,371, Response filed Feb. 12, 2010 to Non Final Office Action mailed Nov. 25, 2009", 12 pgs.

"U.S. Appl. No. 11/284,371, Response filed Mar. 2, 2009 to Non-Final Office Action mailed Nov. 28, 2008", 14 pgs.

"U.S. Appl. No. 11/284,371, Response filed May 16, 2011 to Final Office Action mailed Mar. 16, 2011", 16 pgs.

"U.S. Appl. No. 11/284,371, Response filed Aug. 24, 2010 to Final Office Action mailed Jun. 25, 2010", 17 pgs.

"U.S. Appl. No. 11/284,371, Response filed Aug. 26, 2009 to Final Office Action mailed Jun. 26, 2009", 11 pgs.

"U.S. Appl. No. 11/284,371, Supplemental Response filed Aug. 16, 2011 to Final Office Action mailed Mar. 16, 2011", 13 pgs.

Gilbert, et al., "Globally Progressive Interactive Web Delivery", Eighteenth Annual Joint Conference of the IEEE Computer and Communications Societies, (Mar. 1999), 9 pgs.

\* cited by examiner

TECHNIQUES FOR MEASURING ABOVE-THE-FOLD PAGE RENDERING

RELATED APPLICATION

This application is a continuation of U.S. patent application Ser. No. 11/284,371, filed on Nov. 21, 2005, the benefit of priority of which is claimed hereby, and which is incorporated herein by reference in its entirety.

FIELD

The invention relates generally to data processing and more particularly to techniques for measuring above-the-fold (ATF) page rendering.

BACKGROUND

A growing number of individuals, enterprises, and organizations have developed their own World-Wide Web (WWW) sites and/or WWW browser pages. These sites and pages may be regularly modified and maintained by more astute entities, because it is becoming increasingly clear that the world economy is being driven by electronic commerce of the Internet. In fact, the annual growth rate of electronic commerce has been exponential in recent years.

With this in mind, capturing and maintaining customers or users at a website are important to an entity's ability to remain competitive and grow its business. Studies have indicated that a user's perception of a WWW site's performance is directly tied to when a user believes that the first displayed browser page has been received and is usable.

Current techniques measure a performance of a site or page by determining when a first page is completely loaded into a browser and becomes viewable and usable to a user. However, this approach is not acceptable and may not adequately reflect the true problem.

This is so, because a user actually perceives that a page is usable once that user views information associated with the page within the user's browser. Furthermore, a single page will span beyond the immediate viewing area of the user. That is, a single page may have some of its content viewable via browser scrolling. So, existing techniques are not obtaining an adequate measure of the problem, which is meaningful for purposes of evaluating perceived user perception of a given browser page or WWW site. The existing techniques measure when the first page loads but not when just viewable content is loaded.

SUMMARY

In an embodiment, an above-the-fold (ATF) measuring system is provided within a networked environment. The ATF measuring system includes an ATF measuring service and a log. The ATF measuring service receives a browser page and calculates an elapsed time from a beginning to an ending time for loading an ATF portion of a browser page within a browser. The log is for housing an identity of the browser page and the calculated elapsed time associated with rendering the ATF portion of the browser page to the browser.

Other features will be apparent from the accompanying drawings and from the detailed description that follows.

BRIEF DESCRIPTION OF THE DRAWINGS

Embodiments of the present invention are illustrated by way of example and not limitation in the figures of the accompanying drawings, in which like references indicate similar elements.

DETAILED DESCRIPTION

Methods and systems for measuring above-the-fold (ATF) page rendering are described. In the following description, for purposes of explanation, numerous specific details are set forth in order to provide a thorough understanding of embodiments of the invention. It will be evident, however, to one of ordinary skill in the art that other embodiments of the invention may be practiced without these specific details.

Figure 1:
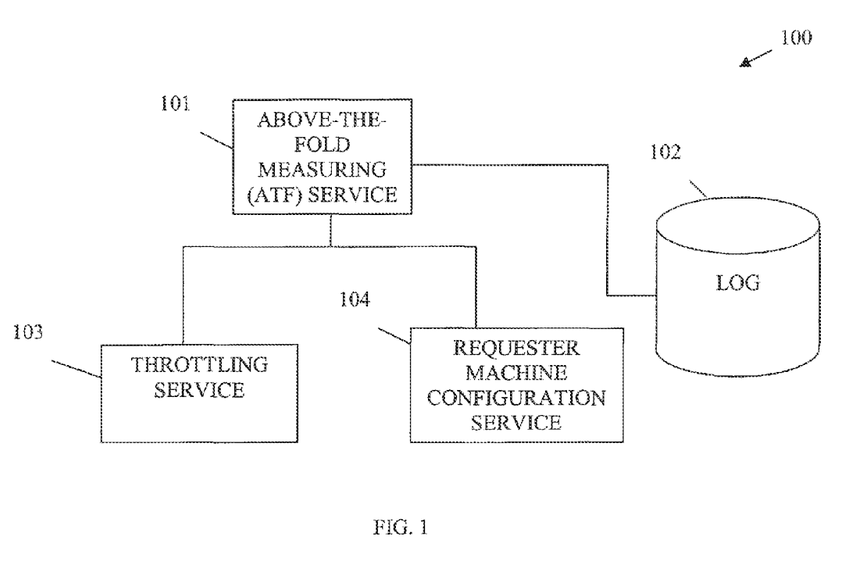
FIG. 1 is a diagram of an above-the-fold (ATF) measuring system, according to an example embodiment.

FIG. 1 is a diagram of an ATF measuring system 100, according to an example embodiment. The ATF measuring system 100 is implemented in a machine-accessible and/or readable medium and is accessible over a network. The network may be wired, wireless, or a combination of wired and wireless. In an embodiment, the ATF measuring system 100 is implemented as service over the WWW and is accessible to and interacts with developers and/or merchants that develop and support WWW browser pages.

The ATF measuring system 100 includes an ATF measuring service 101 and a log 102. In some embodiments, the ATF measuring system 100 may also include a throttling service 103 and/or a requestor machine configuration service 104. Each of these will now be discussed in turn.

ATF refers to a viewable area within a browser that can be seen by a user on a display without scrolling. So, a single browser page most likely span beyond the initial viewing area of the browser as presented on a user's display. The portion that is viewable within the browser on the user's display is referred to as ATF and the portion that may be seen via scrolling within the browser is referred to as below-the-fold (BTF). Stated another way, the fold is pixel dimensions above which objects and content are viewable (referred to as ATF) and below which objects and content are not viewable unless scrolling is performed by the user (referred to as BTF).

The ATF measuring service 101 obtains a measure of an elapsed time or time to load for viewable objects and content, which are ATF. This is a more accurate representation of a user's perception of a web page's or web site's performance, which will then give enterprises a better indication as to how to capture and keep users and how to improve perceptions of their web pages and web site. As will be demonstrated below, the ATF measuring system 100 and its components can also assist in pinpointing particular problem areas with objects or content located within a web or browser page and ATF.

The ATF measuring service 101 measures ATF loading time for a browser page and can perform a variety of other beneficial processes. To do this, the fold is acquired or determined for a given browser page being evaluated. A variety of techniques may be used to acquire dimensions associated with defining the fold. For example, the fold may be predefined to be a set number of pixels, such as 600 pixels. Alternative, the fold dimensions may be supplied to the ATF measuring service 101 as a runtime parameter or configuration profile. Still further, an identity of a requestor or a requestor's device or environment may be used to lookup fold dimensions. In fact, any technique to define the fold may be used with the embodiments presented herein.

During operation of the ATF measuring system 100, the ATF measuring service 101 receives a browser page from a requestor. The browser page is submitted to the ATF measuring service 101 for purposes of determining the page's ATF load time. Again, the fold definition may be obtained with the browser page, before the browser page is received, or after the browser page is received.

In an embodiment, the ATF measuring service 101 may receive the browser page as a Universal Resource Locator or Uniform Resource Locator link (URL). So, a requestor may submit an URL over a network to the ATF measuring service 101 for processing. In response to this, the ATF measuring service 101 produces a log having the ATF loading time for the browser page and/or returns the ATF loading time to the requestor once the browser page is processed.

Next, the ATF measuring service 101 identifies each viewable object or piece of content being rendered within the browser page and occurring ATF. The browser page will identify the objects that it displays, such as images, sounds, video, text, etc. Additionally, a single browser page may include multiple viewing objects of a single type (e.g., audio, video, image, text, etc.).

As visible objects that occur ATF are loaded their beginning and ending times are noted. A variety of techniques may be used to achieve this. For example, a browser's dynamic linked library (DLL) modules or other Application Programming Interface (API) modules will typically raise events as viewing objects are rendered to a browser. These events can be looked for and locations for each viewing object inspected to ensure it is ATF; and a timer may be started and noted once rendering initiates and then further check pointed after each viewing object is loaded ATF. Of course other techniques may be used as well, some may require modifications to a browser and some may utilize existing browser API calls as described above.

Once all viewing objects occurring above the fold are detected as being loaded, the total elapsed time represents the ATF loading time for that browser page. The elapsed time can then be used to analyze the browser page relative to performances of other browser pages and/or predefined thresholds.

The ATF measuring system also includes a log 102. The log 102 may be maintained as a data structure in memory, storage, and/or a data store, such as a database, directory, and/or data warehouse. The log 102 is written to by the ATF measuring service 101 as the ATF measuring service 101 loads the viewing objects within the browser.

In an embodiment, the ATF measuring service 101 records a variety of useful information in the log 102 during the processing of the browser page. For example, the ATF measuring service 101 may record an URL for the browser page, an identifier tier a viewing object within the browser page, pixel locations for each viewing object, a start or beginning time for each view object as it is loaded to the browser, and an ending or final time for each object once it is completely loaded to the ATF portion of the browser page within the browser. The ending or final time may be viewed as a running or elapsed time from when the very first viewing object was initially processed for loading. These individual start and end times for each viewing objects recording within the log 102, permits subsequent analysis to identify particularly troublesome viewing objects. For example, if a particular image viewing object is always initially started first for loading above the fold but is also the last viewing object completely loaded ATF, then this viewing object maybe better served if located BTF.

According to an embodiment, the ATF measuring service 101 may also sort the log 102, such that the final elapsed or ending time for the last loaded viewing object ATF is presented as a first entry within the log. This permits the log 102 to be more easily digested or consumed.

According to an embodiment, the ATF measuring system 100 may also include a throttling service 103. The throttling service 103 mimics the bandwidth or rate at which the browser page is delivered to the ATF measuring service 101. This is beneficial to mimic or simulate the bandwidth of the requestor and to provide a more accurate reflection of the ATF loading time for the browser page relative to a given requestor.

In some cases, the throttling service may be installed on a proxy server that interfaces with the ATF measuring service system 100 and the ATF measuring service 101. Additionally, the throttling service may be configured dynamically to alter the delivery rate of the browser page. In this manner, a browser page may have multiple ATF loading times, one ATF loading time for each bandwidth rate. Thus, a particular browser page may be deemed acceptable for ATF performance with a broadband network connection but unacceptable for ATF performance with a dialup network connection.

In yet another embodiment, the ATF measuring system 100 may include a requestor machine configuration service 104. The requestor machine configuration service 104 simulates or mimics a desired memory or cache configuration of a requestor's device or environment and/or mimics a desired processor configuration. This information can be established for the ATF measuring service 101 before the viewing objects of the browser page are processed for ATF loading time. Similar to the throttling service 103, the requestor machine configuration service 104 helps provide a more realistic and useful ATF loading time measurement to a requestor that is more specific to the requestor's environment and devices. Such information supplied by the requestor machine configuration service 104 may also be used to determine optimal configurations tier requestors, such as minimum random access memory (RAM), processor speed, etc. for a given browser page.

It is noted that if desired the ATF measurement service 101 may also obtain measurements for the entire browser page and record start and ending times for each object loaded within the browser page in the log 102. The log 102 can then be analyzed by the ATF measurement service 101 or another service using the fold definition to obtain the ATF loading time and the entire browser page loading time, since locations within the browser page may also be captured and stored within the log 102 by the ATF measurement service 101. Thus, the log 102 can be analyzed to separate viewable objects ATF from objects that are viewable BTF after scrolling occurs within the browser by looking at the ending location for each listed object within the log 102.

For example, consider the following example contents of a log for a given browser page and a defined fold occurring at 600 pixels:

Fold=600 pixels

| Object | Start Location | End Location | Start Time | End Time | Above Fold Time |
|--------|----------------|--------------|------------|----------|-----------------|
| x  | 10, 10  | 50, 50  | 0:00 | 0:06  | 0:06 |
| z  | 10, 300 | 50, 400 | 0:04 | 0:13  | 0:13 |
| y  | 50, 500 | 70, 700 | 0:08 | 0:141 | 0:11 |
| AA | 50, 700 | 60, 800 | 00:9 | 00:20 | N/A  |

Fold = 600 pixels

In this example, if can be seen that object AA occurs BTF since its end locations are beyond the 600 pixel line that defines the fold. Object y starts ATF but clearly ends BTF, however the portion of y that was completely loaded ATF was obtainable by the ATF measurement service 101 and identified as 0:11 seconds; thus that portion of y that could be detected as being loaded ATF is included in the analysis. Both x and y objects start and end ATF. From these example entries within the log 102, it can be seen that the total elapsed time for ATF loading is 13 seconds and total browser page loading is 20 seconds. One can also see through analysis that object z is a potential bottleneck in the ATF loading since it took 9 seconds to completely load ATF, which is more than any other ATF object.

In the above example, it was demonstrated that object y was included in the ATF analysis but that object AA was not. This is a configuration option to the ATF measurement system 100, such that an option or policy may be enforced that if 50% or more of a given object is viewable ATF than it is included in the analysis of determining the ATF elapsed load time.

An example technique for calculating this situation is as follows. Consider that the fold is defined as being at pixel points (X,Y) and that a particular image, such as y in the above log 102 example has a top left most pixel point of (x1, y1) and a bottom right most pixel point of (x2, y2). The content download time for the ATF portion of y may be determined as:

$$\text{start time} + (\text{end time} - \text{start time}) \times (Y - y1)/(y2 - y1).$$

If different percentages of an object are acceptable as being ATF, then the equation may be modified as necessary to reflect this desired percentage that is acceptable.

One now appreciates how ATF loading times may be established in a detailed manner that is more useful to browser page developers and entities that incorporate the use of browser pages. The detailed information in the log 102 permits entities to more intelligently evaluate their perceived browser page performance and develop strategies to correct problems with browser pages. This can influence user perceptions and perhaps increase business for an entity.

Figure 2:
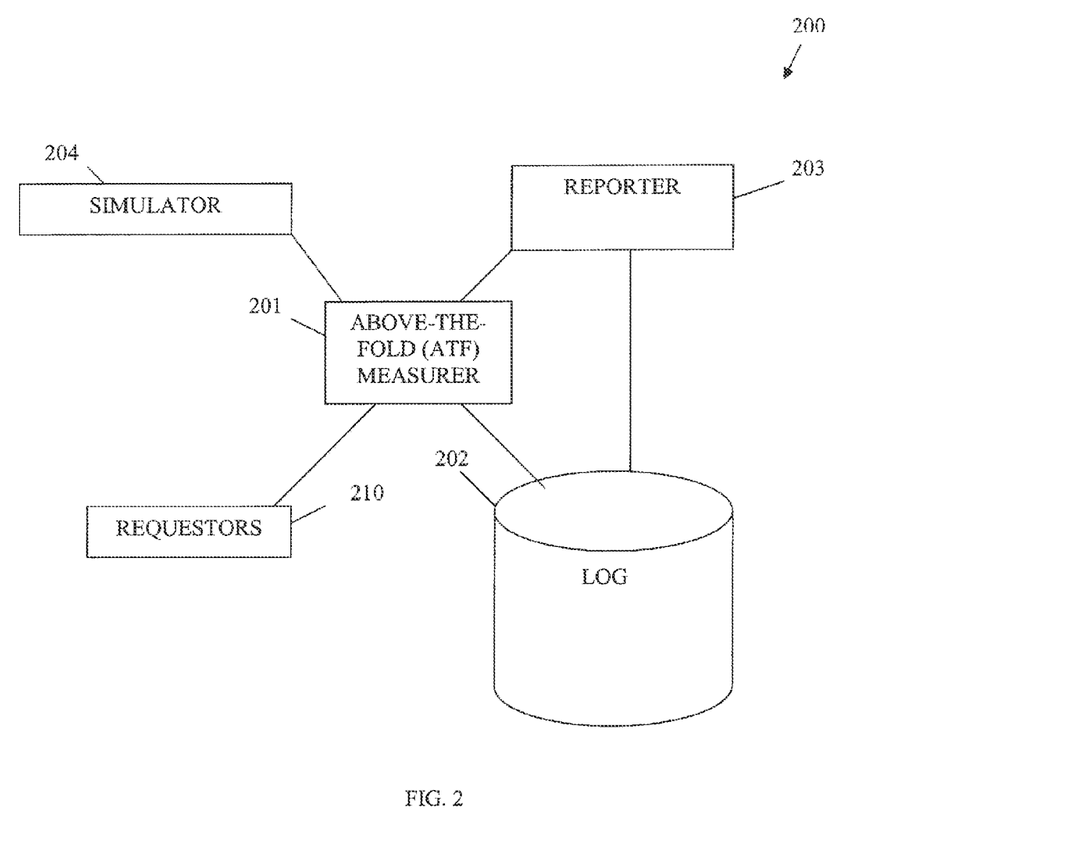
FIG. 2 is a diagram of another ATF measuring system, according to an example embodiment.

FIG. 2 is a diagram of another ATF measuring system 200, according to an example embodiment. The ATF measuring system 200 is implemented in a machine-accessible and/or readable medium and is accessible over a network. The ATF measuring system 200 presents an alternative view of the ATF measuring system 100 presented in FIG. 1.

The ATF measuring system 200 includes an ATF measuring manager 201 and a log 202. In an embodiment, the ATF measuring system 200 may also include a reporter 203 and/or a simulator 204. The ATF measuring system 200 interacts with requestors 210 who provide browser pages or references to browsers pages over a network for purposes of determining an ATF page loading times for the browser pages. Each of the elements of the ATF measuring system 200 will now be discussed in turn.

Again a fold may be viewed as a virtual line in a browser window within a display that divides a browser page into two areas. The line runs horizontal across the page, the visible area lies above the line and is referred to as ATF. The non visible area lies below the line and is referred to as BTF.

The ATF measuring manager 201 is implemented as software instructions and performs services similar to the ATF measuring service 101 of FIG. 1. According to an embodiment, the ATF measuring manager may be implemented as a ATF measuring means having one or more software applications or services that cooperate with one another for purposes of determining an ATF loading time for a given browser page.

The ATF measuring manager 201 resolves the ATF loading time for each visible object within the browser page that occurs in an ATF portion of that browser page. Each object occurring ATF is considered to be visible. Once the last viewable object loads, an ATF page loading time is resolved for the browser page and stored within the log 202.

The log 202 may be a data store, such as a data base, a data warehouse, a directly, an electronic file, and/or various combinations of the same. Additionally, the log 202 may be a data structure that is stored in memory, such as a table. Examples of a log 202 and sample contents for log entries were provided above with log 102 of FIG. 1.

According to an embodiment, the ATF measuring manager 201 initially determines a fold's dimensions for a given or received browser page. Once again, this can be received in a variety of manners, such as being predefined, being associated with an identity of the requestor 210 that supplied the browser page, being associated with an environment of the requestor 210, and/or being supplied as a runtime parameter or configuration of the ATF measuring manager 201. The fold's dimensions represent coordinates for pixels.

In an embodiment, the ATF measuring manager 201 includes or determines an elapsed loading time and pixel position location for each visible object within the log 202. This permits each visible object's loading performance to be determined and analyzed. Moreover, the information may be retained by the ATF measuring manager 201 storing the information along with the identities of the visible objects in the log 202.

In some cases, a particular object within the browser page may lie on both sides of the fold. In such a situation, if a configurable amount of the object lies ATF then that portion may be considered for purposes of determining the ATF page loading time. Examples of this and calculations to resolve this were provided above with the ATF measuring system 100 of FIG. 1.

The ATF measuring manager 201 may also be designed to interact with a simulator 204 for purposes of altering a delivery speed with which the browser page is rendered to the browser. The simulator 204 may also simulate a desired machine configuration associated with the requestor's device that will be loading the browser page. The simulator 204 permits the ATF measuring manager 201 to mimic the requestor's environment. In some cases, the ATF measuring manager 201 may be implemented as an ATF measuring means that includes the processing of the ATF measuring manager 201 and the simulator 204.

In yet another embodiment, the ATF measuring system 200 may also include a reporter 203. The reporter 203 may be implemented as a reporter means that is includes instructions organized as one or more services and applications that cooperate with one another to analyze the log 202 and one or more additional logs associated with ATF page loading measurements for purposes of identifying trends or problem areas with the ATF page rendering.

Figure 3:
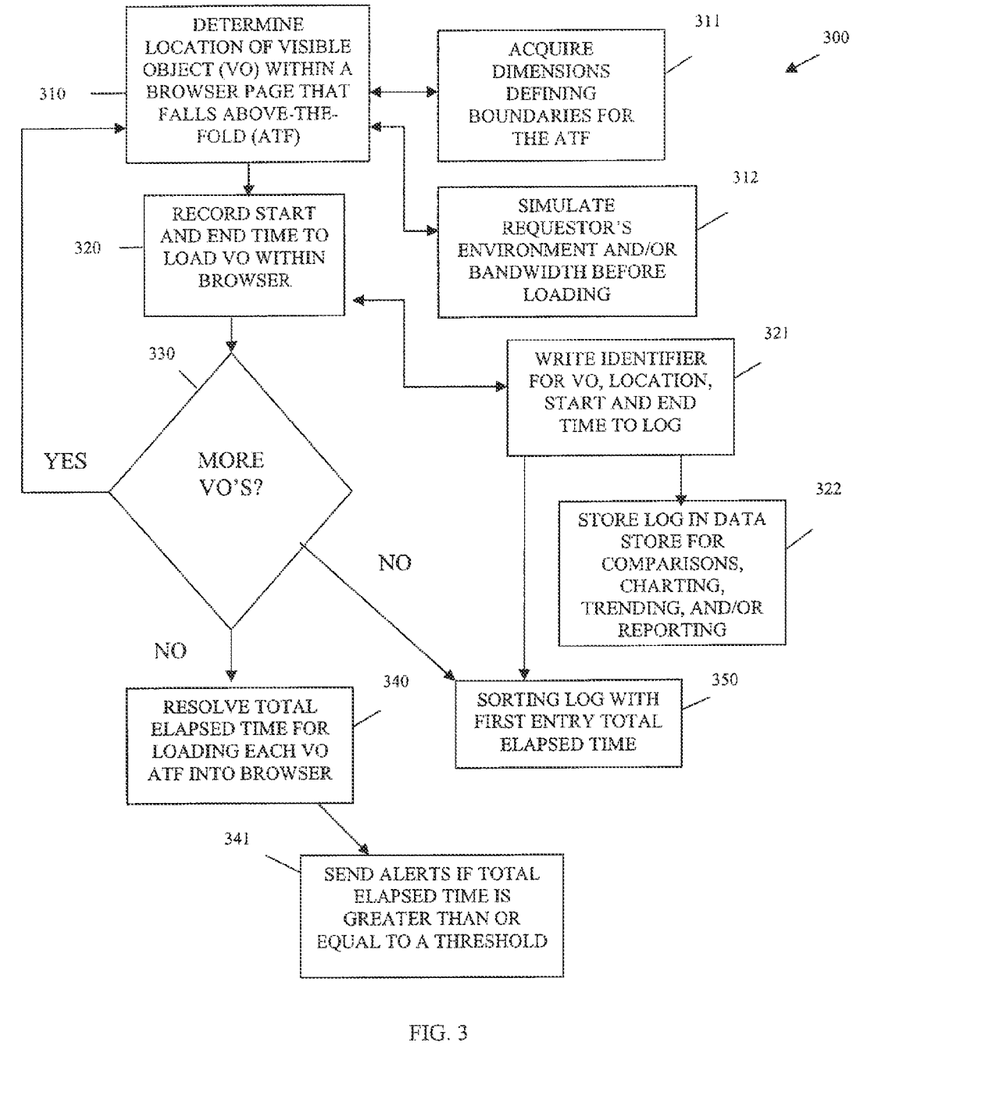
FIG. 3 is a diagram of a method for measuring ATF page rendering, according to an example embodiment.

FIG. 3 is a diagram of a method 300 for measuring ATF page rendering, according to an example embodiment. The method 300 (hereinafter business "ATF measuring service") implemented in a machine-accessible and/or readable medium and is accessible over a network. In an embodiment, the ATF measuring service is implemented within the AT measuring systems 100 or 200 of FIGS. 1 and 2, respectively.

Initially, the ATF measuring service receives a browser page for processing. This may be received as a link, such as an URL or as file reference. In some cases, a batch of browser pages may be received and processed serially by the ATF measuring service.

Once the browser page is known, at 310, the ATF measuring service determines a location of a visible object within that browser page that is located ATF. At 311, the dimensions of the fold are acquired; the dimensions define the boundaries for the ATF. The dimensions of the fold may be acquired before the browser page is received, while the browser page is being received, or after the browser page is received. Various example techniques for acquiring the fold were presented above with the FIGS. 1 and 2.

Additionally and in some embodiments, at 312, the ATF measuring service may also simulate a requestor's environment and/or bandwidth before loading the visible objects of the browser page. This permits a more realistic measurement of the ATF page loading for the requestor. It may also permit different versions of a same browser page to be developed for different bandwidth rates and different environments of machine configurations by revealing different ATF loading times for varying bandwidths and environments for the same browser page. This may also entail using a same browser type and version as a requestor to perform the processing of determining the ATF page loading time.

At 320, the ATF measuring service records the start and end times to load the visible object being processed within the browser. According to an embodiment, at 321, an identifier for the visible object, a location for the visible object ATF, the start time, and the end time may be written to the log. An example of this was provided above with respect to FIG. 1. Moreover, in some cases, at 322, the ATF measuring service may store the log in a data store or portions of the log as it is being written tier purposes of subsequent comparisons, charting, trending, and/or reporting with respect to specific visible objects or browser pages relative to one another.

At 330, a check is made to determine if more visible objects are available for the ATF measuring service to process. If so, then the processing reiterates starting at 310 until each visible object has been processed.

Once each visible object has been processed, at 340, a total elapsed time for loading each visible object ATF into the browser is resolved. In some cases, at 341, an alert may be sent if the total elapsed time is greater than or equal to a threshold. Thus, certain performance thresholds may be established for rendering a browser page ATF and if they are not established interested parties or automated services may be automatically alerted. For example, an alert may be raised to an automated reporting service that generates a report. Alternatively, an alert may be raised via an email notification or instant message to an administrator.

According to an embodiment, at 350, the total elapsed time may be derived from the log and the log may be sorted, such that the first entry of the log represents the total elapsed time and the ATF page loading time.

Figure 4:
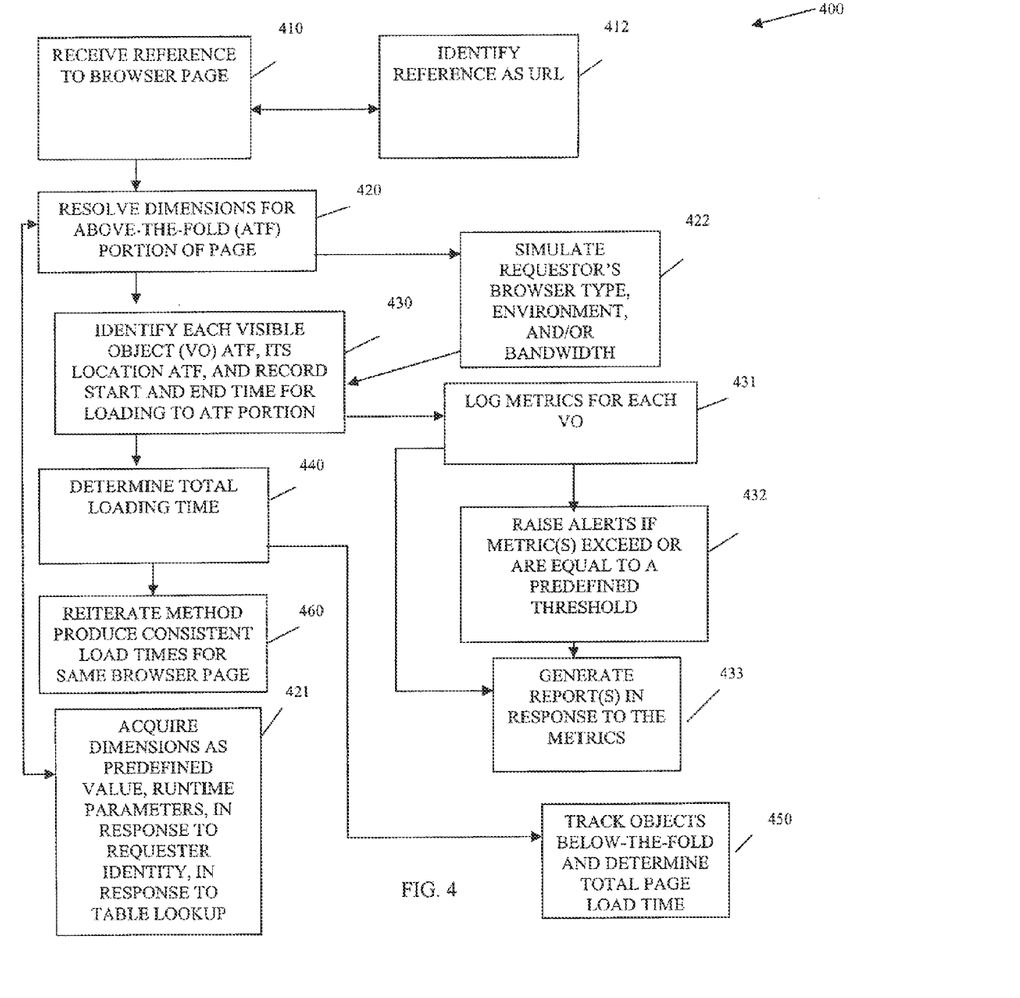
FIG. 4 is a diagram of another method for measuring ATF page rendering, according to an example embodiment.

FIG. 4 is a diagram of another method 400 for measuring ATF page rendering, according to an example embodiment. The method 400 (hereinafter "ATF service") is implemented in a machine-accessible and/or readable medium and is accessible over a network. The ATF service represents an alternative view of the method 300 presented above with respect to FIG. 3.

At 410, the ATF service receives a reference to a browser page. The reference is received from a requestor that desires to have an ATF page loading time resolved for a given browser page that is associated with the references. In an embodiment, at 311, the reference may be received as an URL link.

At 420, the ATF service resolves the dimensions for the ATF portion of the browser page. Thus, the boundary for the horizontal line that splits the browser page into a first portion, which is immediately viewable, and a second portion, which is viewable after scrolling within the browser, is determined or resolved. This virtual line and the pixel boundary that determines it is referred to as the fold.

According to an embodiment, at 421, the fold dimensions may be acquired as a predefined and configured value, as a runtime parameter to the ATF service, in response to an identity associated with the requestor, in response to a table lookup associated with the requestor's devices or environment, etc.

In still another embodiment, at 422, the ATF service may simulate a requestor's browser type and version, the requestor's environment, and/or the requestor's bandwidth. This presents a more realistic calculation as to ATF page loading time.

At 430, the ATF service identifies each visible object located ATF along with each visible object's location ATF. Furthermore, the ATF service records the start and end times for loading the ATF portion of the visible object to the browser. In some cases, any simulation that was performed, at 422, also is fed to the ATF service during the processing at 430.

In an embodiment, at 431, the ATF service may log metrics for each visible object to a log, file, data structure, or data store. Some metrics may include, but are not limited to, an identity of the browser page being processed, an identifier for the visible object being processed, a start and ending location for where the visible object falls with respect to ATF, and a start and end time for beginning to load the visible object and for when the visible object, or at least a portion of the object, is completely loaded. In some case, the visible object may also include a portion that is located BTF. In such a case, if a configurable amount of the object is in fact ATF, then that portion can be included as a visible object for purposes of resolving the ATF page loading time. The metrics may be used to derive the ATF page loading time and to identify or analyze problems with specific visible objects with respect to their loading performance within the browser.

In yet another embodiment, at 432, the ATF service may raise alerts if select ones of the metrics exceed or are equal to a predefined threshold. These alerts may be raised to automated service, such as reporting or analyzing services, or the alerts may be raised to resources, such as devices, other services, users, etc.

In still more embodiments, at 433, the ATF service may generate reports in response to the metrics. The reports may identify trends, may chart certain desired metrics, and/or may provide a history of certain objects and or browser pages based on versioning.

At 440, the ATF service determines the total loading time for loading each visible object ATF. This is the ATF page loading time. In some cases, this total loading time is derived from the log. In other cases, this ATF page loading time is maintained in memory and report out as a result of the ATF service. If a log is used a variety of other features may be implemented, such as the ones discussed and presented herein and above.

According to an embodiment, at 450, the KIT service may also be used to track objects that are visible below-the-fold (BTF). Thus, a total page loading time for visible objects ATF and BTF may be determined by the ATF service. Moreover, the detailed metrics associated with loading each object (ATF or BTF) may be tracked in a log for future analysis.

In yet another embodiment, at 460, the ATF service may be iterated a number of additional times for the same browser page. Each processing cycle of the KIT service produces a consistent result for the total loading time. Thus, unlike manual stopwatch techniques attempting to measure page loading time. The ATF service is an automated, repeatable, and reliable technique that can produce consistent results for a same browser page over multiple iterations and do so in an automated fashion.

In some embodiments, the methods 300 and 400 may be implemented as instructions in a machine-accessible and machine-readable medium. The instructions when loaded to a machine and accessed perform the processing depicted in the methods 300 and 400 of the FIGS. 3 and 4, respectively. The instructions may be stored on a removable media and uploaded to the machine. Alternatively, the instructions may be prefabricated within memory and/or storage of the machine. Still further, the instructions may be downloaded over a network from one machine or storage device to a second machine for processing.

Figure 5:
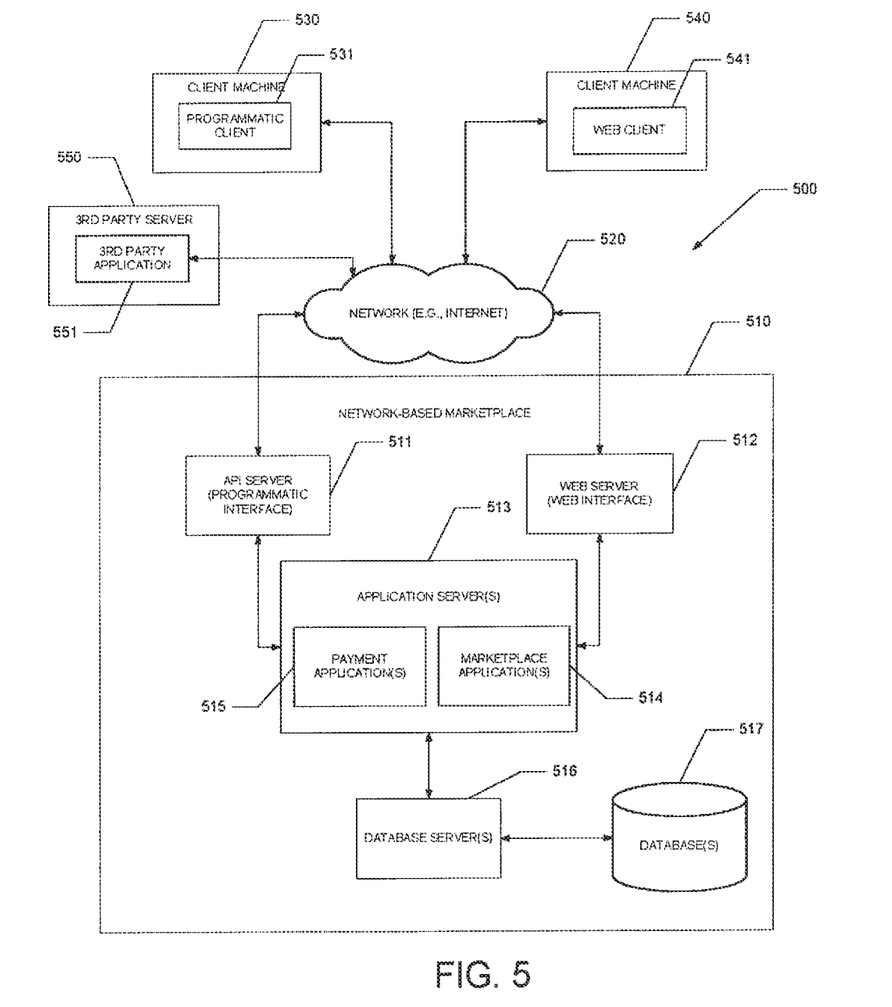
FIG. 5 is a diagram of example network-based commerce system or facility which implements various embodiments associated with the invention.
Figure 6:
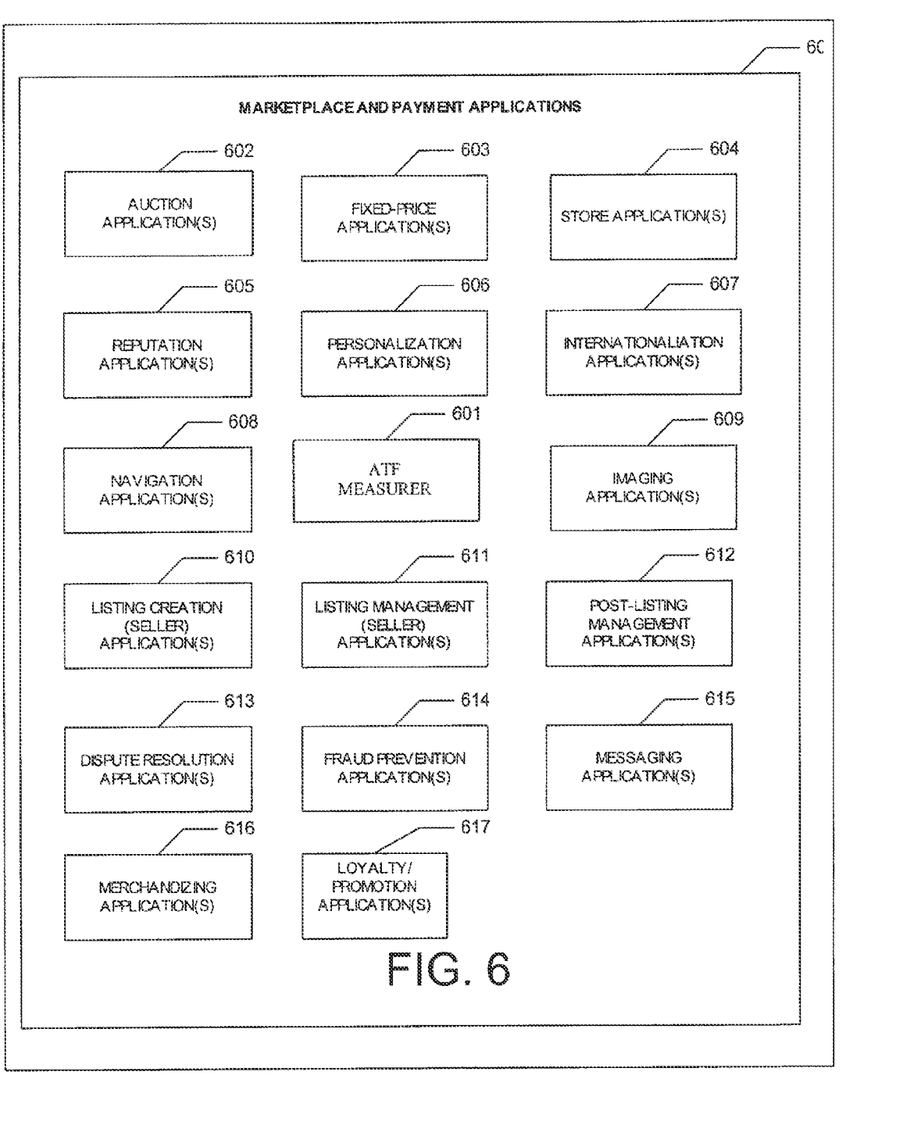
FIG. 6 is a diagram of example applications implemented in connection with some of the components of the network-based commerce system of FIG. 5.
Figure 7:
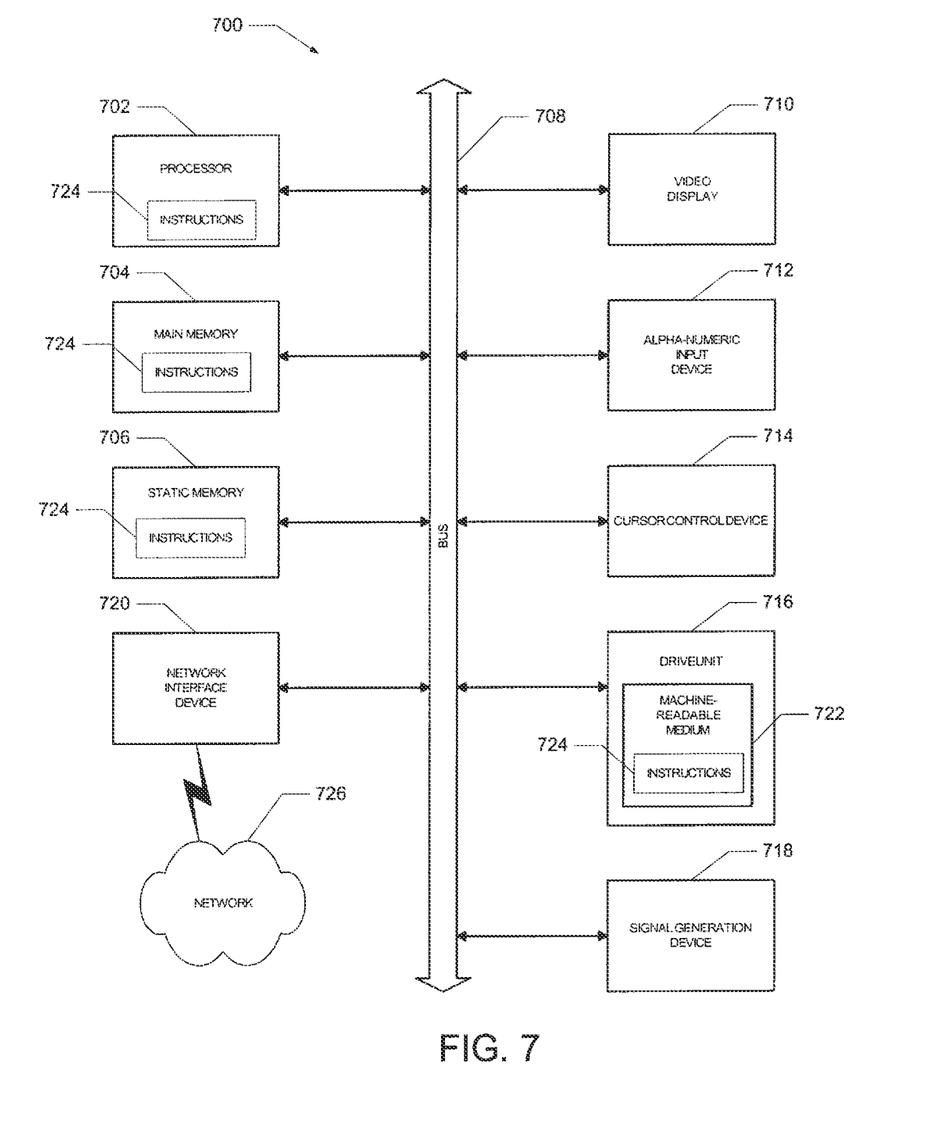
FIG. 7 is a diagram of machine architecture which implements various aspects of the invention, according to an example embodiment.

FIGS. 5-7 are now presented as example implementations of the ATF page rendering measuring processing techniques presented herein. It is understood that these example architectures and arrangements are presented for purposes of illustration only and are not intended to limit other implementations of the teachings presented.

FIG. 5 is a diagram of example network-based commerce system or facility 500 which implements various embodiments associated with the invention. A commerce system 500, in the example form of a network-based marketplace, provides server-side functionality, via a network 520 (e.g., the Internet) to one or more clients.

FIG. 5 illustrates, for example, a web client 541 (e.g., a browser, such as the Internet Explorer browser developed by Microsoft Corporation of Redmond, Wash. State), and a programmatic client 531 executing on respective client machines 540 and 530. It is noted that the browser may be another browser, such as an Open Source browser or another commercial browser and the example implementation is not specifically tied to the Internet Explorer browser product.

An API server 511 and a web server 512 are coupled to, and provide programmatic and web interfaces respectively to, one or more application servers 513. The application servers 513 host one or more marketplace applications 514 and payment applications 515. The application servers 513 are, in turn, shown to be coupled to one or more databases servers 516 that facilitate access to one or more databases 517.

The marketplace applications 514 provide a number of marketplace functions and services to users that access the commerce system 510. The payment applications 515 likewise provide a number of payment services and functions to users. The payment applications 515 may allow users to accumulate value (e.g., in a commercial currency, such as the U.S. dollar, or a proprietary currency, such as "points") in accounts, and then later to redeem the accumulated value for products (e.g., goods or services) that are made available via the marketplace applications 514. While the marketplace and payment applications 514 and 515 are shown in FIG. 5 to both form part of the commerce system 510, it will be appreciated that, in alternative embodiments, the payment applications 515 may form part of a payment service that is separate and distinct from the commerce system 510.

Further, while the system 500 shown in FIG. 5 employs client-server architecture, the present invention is of course not limited to such an architecture, and could equally well find application in a distributed, or peer-to-peer, architecture system for example. The various marketplace and payment applications 514 and 515 could also be implemented as standalone software programs, which do not necessarily have networking capabilities.

The web client 541 accesses the various marketplace and payment applications 514 and 515 via the web interface supported by the web server 512. Similarly, the programmatic client 531 accesses the various services and functions provided by the marketplace and payment applications 514 and 515 via the programmatic interface provided by the API server 511. The programmatic client 531 may, for example, be a seller application (e.g., the TurboLister application developed by eBay Inc., of San Jose, Calif.) to enable sellers to author and manage listings on the commerce system 510 in an off-line manner, and to perform batch-mode communications between the programmatic client 531 and the network-based commerce system 510.

FIG. 5 also illustrates a third party application 551, executing on a third party server machine 550, as having programmatic access to the network-based commerce system 510 via the programmatic interface provided by the API server 511. For example, the third party application 551 may, utilizing information retrieved from the network-based commerce system 510, support one or more features or functions on a website hosted by the third party. The third party website may, for example, provide one or more promotional, marketplace or payment functions that are supported by the relevant applications of the network-based commerce system 510.

FIG. 6 is a diagram of example applications 600 implemented within some of the marketplace applications 514 of the network-based commerce system 510 of FIG. 5. The applications 600 may be hosted on dedicated or shared server machines (not shown) that are communicatively coupled to enable communications between server machines. The architecture of one such example server machine is provided below. The applications themselves are communicatively coupled (e.g., via appropriate interfaces) to each other and to various data sources, so as to allow information to be passed between the applications or so as to allow the applications to share and access common data.

The ATF measurer 601 provides the novel ATF page rendering measurement services described herein. The ATF measurer 601 is coupled or interfaced with a variety of other applications in a commerce system 510. This permits merchants participating in the commerce system 510 to more effectively and intelligently develop browser pages for their online stores, which may also be part of the commerce system.

The commerce system 510 may provide a number of listing and price-setting mechanisms whereby a seller may list (or publish information concerning) goods or services for sale, a buyer can express interest in or indicate a desire to purchase such goods or services, and a price can be set for a transaction pertaining to the goods or services. To this end, the marketplace applications 600 are shown to include one or more auction applications 602 which support auction-format listing and price setting mechanisms (e.g., English, Dutch, Vickrey, Chinese, Double, Reverse auctions etc.). The various auction applications 602 may also provide a number of features in support of such auction-format listings, such as a reserve price feature whereby a seller may specify a reserve price in connection with a listing and a proxy-bidding feature whereby a bidder may invoke automated proxy bidding.

A number of fixed-price applications 603 support fixed-price listing formats (e.g., the traditional classified advertisement-type listing or a catalogue listing) and buyout-type listings. Specifically, buyout-type listings (e.g., including the Buy-It-Now (BIN) technology developed by eBay Inc., of San Jose, Calif.) may be offered in conjunction with an auction-format listing, and allow a buyer to purchase goods or services, which are also being offered for sale via an auction, for a fixed-price that is typically higher than the starting price of the auction.

Store applications 604 allow sellers to group their listings within a "virtual" store, which may be branded and otherwise personalized by and for the sellers. Such a virtual store may also offer promotions, incentives and features that are specific and personalized to a relevant seller.

Reputation applications 605 allow parties that transact utilizing the network-based commerce system 510 to establish, build, and maintain reputations, which may be made available and published to potential trading partners. Consider that where, for example, the network-based commerce system 510 supports person-to-person trading, users may have no history or other reference information whereby the trustworthiness and credibility of potential trading partners may be assessed. The reputation applications 605 allow a user, for example through feedback provided by other transaction partners, to establish a reputation within the network-based commerce system 510 over time. Other potential trading partners may then reference such a reputation for the purposes of assessing credibility and trustworthiness.

Personalization applications 606 allow users of the commerce system 510 to personalize various aspects of their interactions with the commerce system 510. For example a user may, utilizing an appropriate personalization application 606, create a personalized reference page at which information regarding transactions to which the user is or has been) a party may be viewed. Further, a personalization application 606 may enable a user to personalize listings and other aspects of their interactions with the commerce system 510 and other parties.

The network-based commerce system 510 may support a number of marketplaces that are customized, for example, for specific geographic regions. A version of the commerce system 510 may be customized for the United Kingdom, whereas another version of the commerce system 510 may be customized for the United States. Each of these versions may operate as an independent marketplace, or may be customized (or internationalized) presentations of a common underlying marketplace. These are represented as the internationalization applications 607 in FIG. 6.

Navigation of the network-based commerce system 510 may be facilitated by one or more navigation applications 608. For example, a search application enables key word searches of listings published via the commerce system 510. A browse application allows users to browse various category, catalogue, or inventory data structures according to which listings may be classified within the commerce system 510. Various other navigation applications may be provided to supplement the search and browsing applications.

In order to make listings, available via the network-based commerce system 510, as visually informing and attractive as possible, the marketplace applications 600 may include one or more imaging applications 609 utilizing which users may upload images for inclusion within listings. An imaging application 609 also operates to incorporate images within viewed listings. The imaging applications 609 may also support one or more promotional features, such as image galleries that are presented to potential buyers. For example, setters may pay an additional fee to have an image included within a gallery of images for promoted items.

Listing creation applications 610 allow sellers conveniently to author listings pertaining to goods or services that they wish to transact via the commerce system 510 and listing management applications 611 allow sellers to manage such listings. Specifically, where a particular seller has authored and/or published a large number of listings, the management of such listings may present a challenge. The listing management applications 611 provide a number of features (e.g., auto-re-listing, inventory level monitors, etc.) to assist the seller in managing such listings. One or more post-listing management applications 612 also assist sellers with a number of activities that typically occurs post-listing. For example, upon completion of an auction facilitated by one or more auction applications 602, a seller may wish to leave feedback regarding a particular buyer. To this end, a post-listing management application 612 may provide an interface to one or more reputation applications 605, so as to allow the seller conveniently to provide feedback regarding multiple buyers to the reputation applications 605.

Dispute resolution applications 613 provide mechanisms whereby disputes arising between transacting parties may be resolved. For example, the dispute resolution applications 613 may provide guided procedures whereby the parties are guided through a number of steps in an attempt to settle a dispute. In the event that the dispute cannot be settled via the guided procedures, the dispute may be escalated to a third party mediator or arbitrator.

A number of fraud prevention applications 614 implement fraud detection and prevention mechanisms to reduce the occurrence of fraud within the commerce system 510.

Messaging applications 615 are responsible for the generation and delivery of messages to users of the network-based commerce system 510, such messages for example advising users regarding the status of listings at the commerce system 510 (e.g., providing "outbid" notices to bidders during an auction process or to provide promotional and merchandising information to users).

Merchandising applications 616 support various merchandising functions that are made available to setters to enable sellers to increase sales via the commerce system 510. The merchandising applications 616 also operate the various merchandising features that may be invoked by sellers, and may monitor and track the success of merchandising strategies employed by sellers.

The network-based commerce system 510 itself, or one or more parties that transact via the commerce system 510, may operate loyalty programs that are supported by one or more loyalty/promotions applications 617. For example, a buyer may earn loyalty or promotions points for each transaction established and/or concluded with a particular seller, and may be offered a reward for which accumulated loyalty points can be redeemed.

FIG. 7 is a diagram of machine architecture 700 which implements various aspects of the invention, according to an example embodiment. The machine includes a set of instructions, which when executed on the machine cause the machine to perform any one or more of the methodologies discussed herein. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a server computer, a client computer, a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer architecture 700 includes a processor 702 (e.g., a central processing unit (CPU) a graphics processing unit (GPU) or both), a main memory 704 and a static memory 706, which communicate with each other via a bus 708. The architecture 700 may further include a video display unit 710 (e.g., a liquid crystal display (LCD) or a cathode ray tube (CRT)). The architecture 700 also includes an alphanumeric input device 712 (e.g., a keyboard), a cursor control device 714 (e.g., a mouse), a disk drive unit 716, a signal generation device 718 (e.g., a speaker) and a network interface device 720.

The disk drive unit 716 includes a machine-readable medium 722 on which is stored one or more sets of instructions (e.g., software 724) embodying any one or more of the methodologies or functions described herein. The software 724 may also reside, completely or at least partially, within the main memory 704 and/or within the processor 702 during execution thereof by the architecture 700, the main memory 704 and the processor 702 also constituting machine-readable media.

The software 724 may further be transmitted or received over a network 826 via the network interface device 720.

While the machine-readable medium 722 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present invention. The term "machine-readable medium" shall accordingly be taken to include, but not be limited to, solid-state memories, optical and magnetic media, and carrier wave signals.

Thus, a method and system to provide novel ATF page rendering measuring services have been described. Although the present invention has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense.

The above description is illustrative, and not restrictive. Many other embodiments will be apparent to those of ordinary skill in the art upon reviewing the above description. The scope of embodiments should therefore be determined with reference to the appended claims, along with the full scope of equivalents to which such claims are entitled.

The Abstract is provided to comply with 37 C.F.R. §1.72(b) and will allow the reader to quickly ascertain the nature and gist of the technical disclosure. It is submitted with the understanding that it will not be used to interpret or limit the scope or meaning of the claims.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate example embodiment.

The invention claimed is:

1. A method comprising:
   accessing a page;
   determining a boundary that divides the page into an immediately viewable area and an immediately non-viewable area, the determining of the boundary being performed by a processor of a machine;
   identifying an object within the page and across which the determined boundary runs, the identified object having a first portion in the immediately viewable area of the page and having a second portion in the immediately non-viewable area of the page; and
   measuring a duration for loading the first portion of the identified object into a browser.

2. The method of claim 1, wherein:
   the immediately viewable area of the page is an above-the-fold portion of the page;
   the immediately non-viewable area of the page is a below-the-fold portion of the page; and
   the determined boundary divides the page into the above-the-fold portion and the below-the-fold portion.

3. The method of claim 1, wherein:
   the immediately non-viewable area of the page is not viewable in the browser unless the page is scrolled.

4. The method of claim 1, wherein:
   the determining of the boundary that divides the page includes determining a line that splits the page into the immediately viewable area and the immediately non-viewable area.

5. The method of claim 4, wherein:
   the determining of the line that splits the page includes determining a virtual line that splits the page into the immediately viewable area and the immediately non-viewable area.

6. The method of claim 4, wherein:
the determining of the line that splits the page includes determining a horizontal line that splits the page into the immediately viewable area and the immediately non-viewable area;
the immediately viewable area is above the horizontal line that splits the page; and
the immediately non-viewable area is below the horizontal line that splits the page.

7. The method of claim 1 further comprising:
logging the measured duration for loading the first portion of the identified object into the browser.

8. The method of claim 1, wherein:
the determining of the boundary that divides the page includes accessing a number of pixels that defines a location of the boundary within the page.

9. The method of claim 8, wherein:
the accessing of the number of pixels that defines the location of the boundary is from a runtime parameter of a measurement service configured to measure a further duration for loading the immediately viewable area of the page into the browser.

10. The method of claim 8, wherein:
the accessing of the number of pixels that defines the location of the boundary is from a configuration profile of a measurement service configured to measure a further duration for loading the immediately viewable area of the page into the browser.

11. The method of claim 1, wherein:
the determining of the boundary that divides the page is in response to a request to measure a further duration for loading the immediately viewable area of the page into the browser; and
the method further comprises receiving the request to measure the further duration for loading the immediately viewable area of the page into the browser.

12. The method of claim 11, wherein:
the receiving of the request is from a requester; and
the determining of the boundary that divides the page is based on an identifier of the requester.

13. The method of claim 11, wherein:
the receiving of the request is from a device of a requester; and
the determining of the boundary that divides the page is based on an identifier of the device of the requester.

14. The method of claim 11, wherein:
the receiving of the request is from a device of a requester within a network environment; and
the determining of the boundary that divides the page is based on an identifier of the network environment that includes the device of the requester.

15. The method of claim 1, wherein:
the identifying of the object within the page identifies the first portion of the object within the immediately viewable area of the page.

16. The method of claim 1, wherein:
the identifying of the object within the page identifies the second portion of the object within the immediately non-viewable area of the page.

17. A non-transitory machine-readable storage medium comprising instructions that, when executed by one or more processors of a machine, cause the machine to perform operations comprising:
accessing a page;
determining a boundary that divides the page into an immediately viewable area and an immediately non-viewable area, the determining of the boundary being performed by the one or more processors of the machine;
identifying an object within the page and across which the determined boundary runs, the identified object having a first portion in the immediately viewable area of the page and having a second portion in the immediately non-viewable area of the page; and
measuring a duration for loading the first portion of the identified object into a browser.

18. The non-transitory machine-readable storage medium of claim 17, wherein:
the measuring of the duration includes determining a start time and an end time for loading the first portion of the identified object into the browser, the start time corresponding to a beginning of a load of the first portion of the object into the browser, the end time corresponding to an ending of the load of the first portion of the object into the browser.

19. A system comprising:
a machine configured by instructions that, when executed by the machine, cause the machine to perform operations comprising:
accessing a page;
determining a boundary that divides the page into an immediately viewable area and an immediately non-viewable area, the determining of the boundary being performed by a processor of a machine;
identifying an object within the page and across which the determined boundary runs, the identified object having a first portion in the immediately viewable area of the page and having a second portion in the immediately non-viewable area of the page; and
measuring a duration for loading the first portion of the identified object into a browser; and
a log configured to store the measured duration for loading the first portion of the identified object into the browser.

20. The system of claim 19, wherein the instructions, when executed by the machine, cause the machine to perform the determining of the boundary that divides the page by accessing a number of pixels that defines a location of the boundary within the page.

* * * * *